Figure 1:
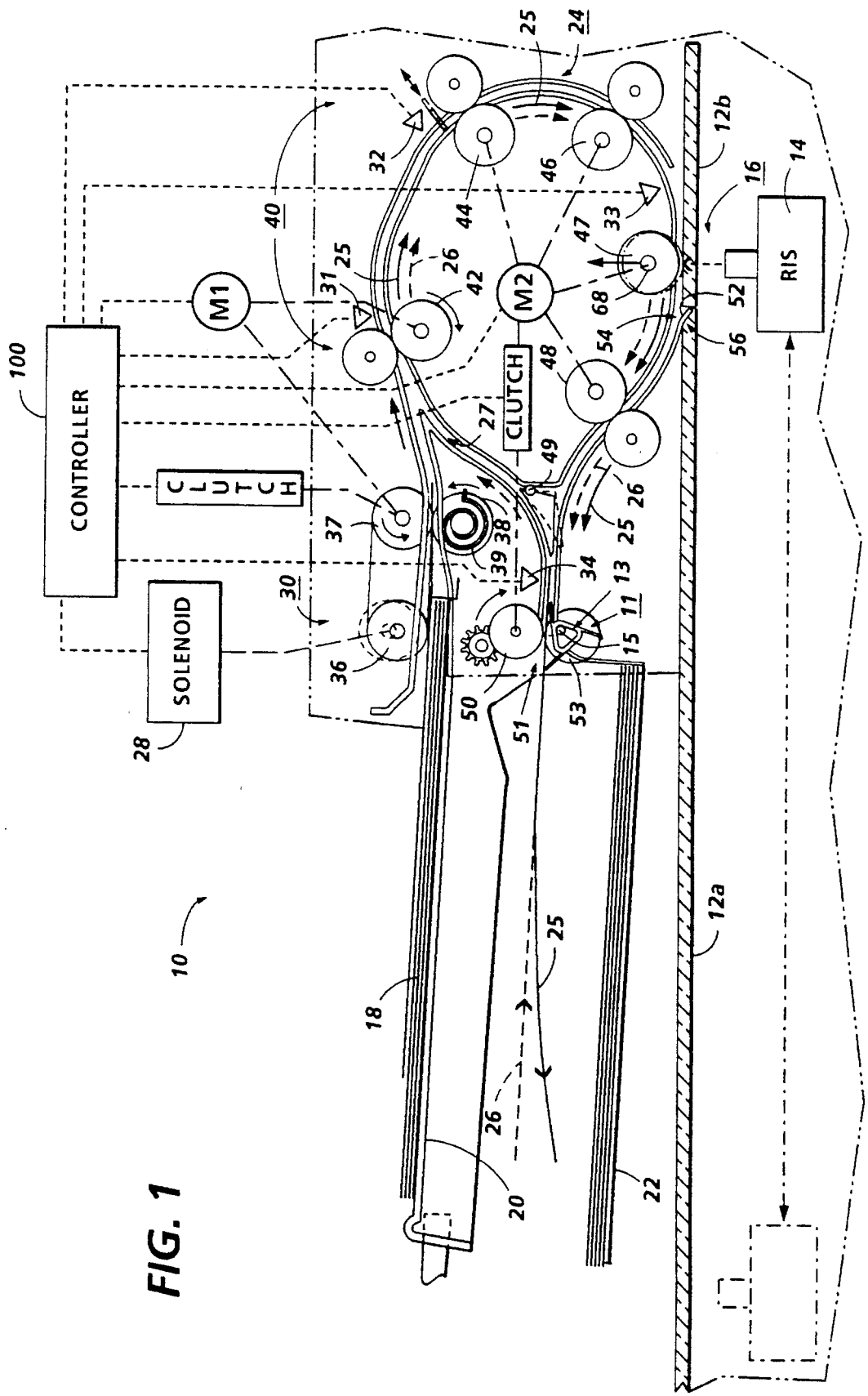

United States Patent [19]
Dempsey et al.

[11] Patent Number: 5,461,468
[45] Date of Patent: Oct. 24, 1995

[54] DOCUMENT HANDLER INTERDOCUMENT GAP CONTROL SYSTEM

[75] Inventors: Neil J. Dempsey, Victor; Stephen J. Wenthe, Jr., West Henrietta; Gerald L. Coy, Rochester, all of N.Y.

[73] Assignee: Xerox Corporation, Stamford, Conn.

[21] Appl. No.: 332,054

[22] Filed: Oct. 31, 1994

[51] Int. Cl.$^6$ .................................................. G03G 21/00
[52] U.S. Cl. .......................... 355/316; 271/259; 271/270
[58] Field of Search ................................... 355/316, 317; 271/259, 265, 270

[56] References Cited

U.S. PATENT DOCUMENTS

| | | | |
|---|---|---|---|
| 4,579,444 | 4/1986 | Pinckney et al. | 355/14 |
| 5,339,139 | 8/1994 | Fullerton et al. | 355/215 |
| 5,423,527 | 6/1995 | Tranquilla | 271/259 X |

OTHER PUBLICATIONS

Xerox Disclosure Journal vol. 15, No. 5, Sep./Oct. 1990 pp. 353–354.

Primary Examiner—R. L. Moses

[57] ABSTRACT

A document handling system for sequentially feeding document sheets to be imaged with a controlled minimized interdocument gap therebetween even though the sheet separator-feeder sequentially feeds the documents from the stack in the input tray with initial interdocument gap variations to a second transport path portion feeding the document sheets through the imaging station at a constant velocity. A first servo drive feeds the documents in a first path portion including the separator-feeder, and a second servo drive feeds the documents in a second path portion providing the constant velocity. A sheet edge sensor in the first path portion signals the passage of the lead or trail edge of document sheets. A servo controller connecting with the sheet edge sensor and the first servo drive automatically measures the initial interdocument gap variations and change the feeding of document sheets in the first path portion so as to automatically changes the interdocument gap to a preset desired minimum interdocument gap in the second path portion. Preferably the second servo drive has an encoder generating signals proportional to its drive and the servo controller counts these signals between the passage of the trail edge of one document sheet and the passage of the lead edge of the next sequential document sheet past the sheet edge sensor, to calculate control signals for the first servo drive to drive it variably longer at a higher velocity than the second servo drive.

6 Claims, 2 Drawing Sheets

DOCUMENT HANDLER INTERDOCUMENT GAP CONTROL SYSTEM

Cross-referenced is another application by the same assignee showing a somewhat similar document handler, with distributed drives, application No. 08/251,064, filed May 31, 1994 by the same Stephen J. Wenthe, Jr., together with others.

There is disclosed herein an improved system for controlling the interdocument gap or spacing between document sheets being sequentially fed in an automatic document handler. The disclosed exemplary embodiment system accurately measures initial interdocument gap variations and utilizes distributed drives to automatically adjust the velocity of one document sheet relative to another to reduce the interdocument gap to an optimum minimum spacing, and thus maximize the productivity of the document handler. The variation from the desired interdocument gap of the actual initial interdocument gap (which, as will be noted, varies considerably with operation of the sheet separator-feeder), may be accurately measured, and the distance between the two documents then adjusted in a controlled manner toward a desired interdocument gap automatically, while the documents are being fed, and before imaging. The disclosed embodiment is particularly advantageous for automatically feeding a set of document sheets to be electronically imaged from one or both sides in a digital copier, scanner, and/or facsimile machine in serial order with a very compact and low cost but reliable document feeding apparatus.

By way of background as to the problems addressed, in order to maximize productivity in a document feeder, it is important to maintain as small as possible an interdocument gap between the document sheets being sequentially fed to be imaged. A large interdocument gap represents wasted space and thus wasted time between document sheets, and therefore reduces the overall imaging or copying rate. This is especially true for a document feeder for electronic imaging, such as for a digital copier, scanner, and/or fax, or other digital imaging system, or combinations thereof, since such document imagers may be asynchronous systems. That is, a document feeder for a digital imager can have wide latitude in its variation between sheet feeds and/or more closely spaced (smaller gap) document sheet feeds than for a light-lens copier, because in a digital imaging system it is not necessary to synchronize the document sheet feed time to a copy sheet feed time, as in many light-lens copiers.

Although there is thus more tolerance for the interdocument gap in digital imaging systems, the loss in productivity or imaging rate is even more important, because rapid electronic acquisition of the entire set of documents is desired to be accomplished in a minimum time, without requiring a highly expensive document feeder. The total acquisition time for capturing all of the electronic page images of all of the document sheets in a document set is greatly affected by excessive interdocument gaps in the feeding path from the document input stack to the imaging station. Also, for duplex precollation reproduction or facsimile transmissions of documents fed by N to 1 document feeders, and other functions, it is desirable in some situations to capture and store all the images of all the pages of the document set before starting to print or transmit the first page. Thus, in such cases the total acquisition time can also impact the first copy out time or cause starting time delays.

Variability in the interdocument gaps is an inherent problem. That is, the reasons for large variations in the interdocument gap, (the distance between successive documents in the document path) include normal and unavoidable results of the geometry and operation of the sheet separator/feeder mechanism. For example, where a typical or common sheet retard separator/feeder is utilized, the document sheets are fed from a stack edge registration position into a downstream sheet shingling retard feed nip. The exit for single sheets from this retard nip may be 20 mm or more downstream from the edge alignment position of the stacked sheets. At the time a feed signal is given to the sheet feeder, the next sheet to be fed may be located anywhere from the upstream stack registration edge position all the way into the downstream retard nip exit. If sheets have already been shingled in the retard nip from previous feedings, as is frequently the case, the next sheet will feed (fast) from the downstream retard nip position, not the upstream stack edge position. Thus, there is considerable variation in the starting position of a sheet being fed at the time the signal to start the feed of that sheet is given, and thus considerable variation in the actual feedout time of a document from the feeder.

A further variation in interdocument gaps is due to variations in the acquisition time of the sheet being fed, often due to slip in the feeder. Most sheet feeders have or require some slip of the acquisition or nudger feed rollers or vacuum belts acting on the sheet being fed, particularly during the initial acquisition and acceleration of the sheet. That acquisition time can vary considerably. This creates further variations in the interdocument gap by further varying the times in which subsequent document sheet lead edges actually exit the feeder. An additional variation is in the operating times required for, and/or variations in the actuating times for, solenoids and clutches in the feeder. (Once the sheet fed out is acquired fully by the feeder take-away rolls, however, further slip or feeding variation is unlikely.)

An additional document handling constraint, however, is that in a document imaging system in which the document is moving while it is being imaged, otherwise known as a constant velocity transport or CVT document handler, all of the portions of the document being imaged must be fed at the same constant velocity. That is, the document which is being imaged cannot have its velocity changed during imaging.

Furthermore, if the interdocument gap is made too small, sheet jams and path feeding unreliability or document damage can increase. E.g., gates may not clear in time between sheets, or exiting sheets may not settle in time. Sheet jam or misfeed avoidance is important to any reproduction system document handler or sheet feeder, but is especially important for remote scanners, fax or multifunction machines, where the output (printed copies) cannot be checked for errors because it is not at the same location as the image input. Furthermore, job recovery necessitated by a jam or misfeed can be quite complicated, especially if duplex, i.e., two sided documents (requiring inversion) were being imaged or copied. If job recovery is not done fully correctly, it will result in scrambled or uncollated copies being printed thereafter from that job set of documents. Where the printing is remote, such job recovery error may not be detected until after an entire print run of that job at all the remote print locations. With bound copy sets, the entire defective print run may have to be destroyed at each location.

Another document handler design constraint is that it is desired to have a compact document handler, and to have a short overall document path length. These features provide several advantages, as is known in the art and described in various of the cited references herein. This desired short document path length, however, limits the capability of the system to adjust or change document velocity or spacing, particularly when, as described above, the document is being fed into a CVT transport to and through an imaging station, which, as noted, is a part of the document path which cannot have its velocity adjusted during imaging.

An additional complication arises where it is desired to briefly stop the feeder in order to partially buckle and deskew the document against a gate or stopped nip after the document is initially fed, before it enters the CVT or other downstream transport for imaging. When a sheet lead edge is being stopped or buckled for registration or deskew under control of the feeder, the previously fed sheet is still moving forward and increasing the interdocument gap. To measure this interdocument gap from the next sheet with or while the feeder and the next sheet is buckling and/or at zero velocity (in a cost effective manner) is a difficult estimation which can induce inherent error.

The disclosed system overcomes the above and other problems. It is compatible with the various above design constraints and desired document handling features.

The embodiment disclosed herein of one exemplary document feeder in which the present system for overcoming these and other problems may be utilized is similar to that disclosed in U.S. Pat. No. 5,339,139, issued Aug. 16, 1994 to Jack K. Fullerton, et al, by Xerox Corporation. Note especially the disclosure therein of a retard sheet feeder example and two distributed drives, i.e., the two different drive motors, M1 and M2 driving first and second portions of the document path. However, there are important differences between that drive system and the drive system disclosed in the embodiment herein, as will be discussed further herein.

Further by way of general background on servo document feeding in general, there is noted for example Xerox Disclosure Journal publication Volume 15, No. 5, of September/October, 1990, pages 353–354; and Xerox Corporation U.S. Pat. No. 4,579,444, issued Apr. 1, 1986 to T. S. Pinckney and Hector J. Sanchez, and references cited therein including the servo control document sheet transports cited in Column 6 of said U.S. Pat. No. 4,579,444.

More specifically, features disclosed in the specific exemplary embodiment herein include a document handling system for sequentially feeding document sheets with an interdocument gap therebetween to be imaged at an imaging station, including a sheet separator-feeder feeding the document sheets from a stack of document sheets in an input tray through a document feeding path to said imaging station, and including a constant velocity document sheet transport for feeding the document sheets through said imaging station at a constant velocity; wherein said sheet separator-feeder sequentially feeds document sheets from said stack of document sheets in said input tray with initial interdocument gap variations, the improvement comprising: a system for automatically controlling the interdocument gap between said sequential document sheets in said document feeding path; said document feeding path having an upstream first document feeding path portion; a first servo drive system for feeding the document sheets in said first document feeding path portion; a second document feeding path portion downstream of said first document feeding portion for receiving the document sheets fed from said first document feeding path portion; a second servo drive system for feeding the document sheets in said second document feeding path portion; said second servo drive system providing said constant velocity document sheet transport through said imaging station; a sheet edge sensor system in said first document feeding path portion adjacent to and downstream of said sheet separator-feeder for providing an electrical signal upon the passage therepast of the lead or trail edge of document sheets in said first document feeding path portion; and a servo controller connecting with said sheet edge sensor system and said first servo drive system to automatically measure said initial interdocument gap variations and change the feeding of document sheets in said first document feeding path portion relative to said second document feeding path portion to automatically change said interdocument gap to a preset desired minimum interdocument gap in said second document feeding path portion.

Further disclosed features of the exemplary embodiment herein include, individually or in combination, those wherein said second servo drive system has an encoder generating encoder signals proportional to said constant velocity sheet transport and said servo controller counts said encoder signals between the passage of the trail edge of a document sheet past said sheet edge sensor system and the passage of the lead edge of the next sequential document sheet past said sheet edge sensor system, and compares that encoder signals count to a preset stored count to calculate control signals for said first servo drive system to automatically change said initial interdocument gap toward said desired minimum interdocument gap; and/or wherein said sheet edge sensor system comprises a sheet edge sensor closely adjacent the sheet exit of said separator-feeder; and/or wherein said first servo drive system changes said initial interdocument gap by changing the time period in which said first servo drive system is driven at a substantially higher speed than said second servo drive system; and/or wherein said sheet edge sensor system comprises a sheet edge sensor closely adjacent the sheet exit of said separator-feeder.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being imaged. A "simplex" document (or copy sheet) is one having its image and page number on only one side or face of the sheet, whereas a "duplex" document (or copy sheet) has "pages", and normally images, on both sides, i.e., each duplex document is considered to have two opposing sides, faces, or "pages" even though no physical page number may be present.

As to specific hardware and electrical components in connection with embodiments of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Figure 2:
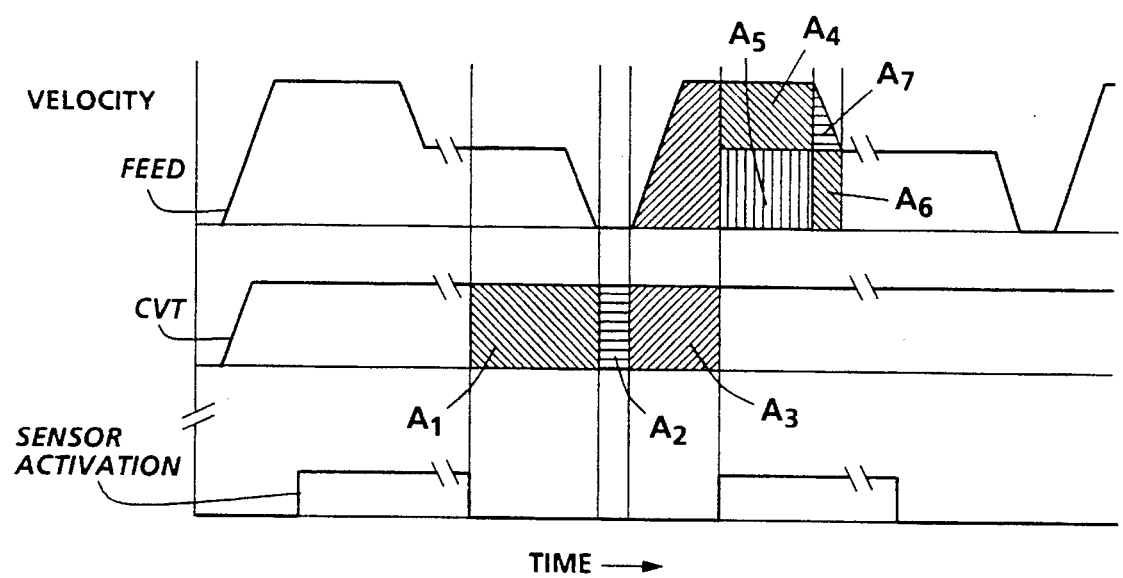

Various of the above-mentioned and further features and advantages will be apparent from the specific apparatus and its operation described in the example below, as well as the claims. Thus, the present invention will be better understood from this description, including the drawing figures (approximately to scale) wherein:

FIG. 1 shows one embodiment of an exemplary interdocument gap control system in an exemplary simplex and duplex document handling system; and FIG. 2 is an illustrated timing chart for the interdocument gap control system of FIG. 1, with three superposed lines for three components thereof, as will be described.

Describing now in further detail the exemplary embodiment with reference to the Figures, first, there is shown in FIG. 1 an exemplary document handler 10 providing the advantageous features noted above for an electronic copier and/or scanner, incorporating one example of the subject interdocument sheet gap control system, to be described later herein. This exemplary document handling system 10, as in said cited U.S. Pat. No. 5,339,139, includes a desirable small loop document path. It also provides "immediate" type duplex document inversion with the duplex sheet inverter chute path located over the top of the stack in the return or exit tray and under the input tray. This highly compact and lightweight document handler 10 may be a part of an optional or add-on top module of a convertible digital copier/scanner unit (not fully shown). A platen 12 is provided with a large platen portion 12a, which may be scanned by a rastor input scanner or RIS 14, also part of the module. The exemplary RIS 14 here may be, e.g., a diode type full width array of a conventional type for high resolution, scanning closely under the platen. The entire scanner or input module, including the platen 12 and the RIS 14 desirably may be a removable top module so that the underlying processor or printer unit may alternatively be used as a stand alone or remote digital printer for remote electronic input. With the top module, including the document handler 10, mounted on the digital printer unit, the integrated unit provides a fully integrated convenience copier which even a casual operator may use simply by placing documents 18 in a document input tray 20 and automatically copying them at an imaging station 16 as if this were a normal light lens copier rather than a digital copier. Alternatively, the same document input at imaging station 16 (or platen portion 12a) provided here may also be easily used for facsimile transmissions. In that case the documents 18 will be similarly electronic imaged by RIS 14, but then transmitted over telephone lines or any other communications media, with or without electronic storage or buffering. Only the relevant portions of the digital copier top module and its document handler 10 need be illustrated here since the digital printer or copy processor on which it may be mounted may be any of various known, conventional, or new electronic printer units, which do not per se form part of this invention, and therefore need not be described.

The same RIS 14 in this example may be utilized for scanning documents manually placed on the platen portion 12a as well as documents which are automatically fed to be imaged on platen portion 12b by the document handler 10. This is provided here by a two part platen 12 comprising a full size scanning platen portion 12a and a narrow slit scanning portion 12b. As may be seen, these two platen portions 12a and 12b are preferably closely adjacent one another and in the same plane and utilize the same frame mounting and/or alignment system. The two document trays 20, 22 may thus also primarily overlay the platen portion 12a rather than extend the machine footprint.

In the disclosed CVT (constant velocity transport) system, including a driven over-platen roller 47, all three CVT document feeding rollers, 46, 47 and 48 may be commonly driven by the same motor, such as servo motor M2, at the same speed, while the document is being imaged. The pre and post platen document feeding roller surfaces 46, 48 may, if desired, be metallic drive rollers, grit blasted, for increased long term drive radius stability and velocity control as compared to conventional elastomer document feeding surfaces.

The document handler 10 feeds documents to be imaged at a constant velocity with this CVT system past a scanning or slit image station 16 which is at the slit scanning platen portion 12b, as shown. For this document handler 10 document imaging, the RIS 14 is "parked" at this imaging station 16.

Documents 18 may be loaded face up in normal order in the document input tray 20 of the document handler 10 when automatic document input is desired. The stack of documents is then sequentially fed from the input tray 20 through a short, highly compact, "U" shaped document path 24 for imaging at the imaging station 16, and then after one imaging the simplex documents are fed directly on to a document output tray 22 in which the documents are restacked face down. However, as will be described, there is a partial difference in the document paths provided for simplex documents as compared to duplex documents. This is illustrated here by solid arrows representing the simplex document path 25 and dashed line arrows representing the duplex path 26. Note, however, that both simplex and duplex documents are ejected and restacked in the same document output tray 22 here, in the same manner, after their copying is completed.

The document input tray 20 here is closely superimposed above the document output tray 22. That is, these two trays closely overlay one another to form a relatively enclosed space between the two trays. Yet, both trays are readily operator accessible. This space between the two trays 20 and 22 provides a protective and space saving inverter chute for duplex documents which are being inverted between the copying of their first and second sides.

Note that the U-shaped document path 24 contains a single natural inversion for turning each document sheet over once between its infeeding from input tray 20 and the imaging station 16. This is the only inversion in this document path 24. And there is no inversion in the duplex path 27 added portions. The document path 24 is like a "U" lying on its side, facing and connecting with the input tray 20 and output tray 22 at the upper and lower ends of the "U", and with the imaging station 16 on the bottom side of the "U". It may also be seen that the duplex document path 27 utilizes the same U-shaped document path 24 shared by both simplex and duplex documents, but additionally provides a short duplex documents return path from the output end of the U-shaped document path 24 back to the input of that path 24, as will be further described.

All of the document sheet feeding in the document path 24, including the duplex document path 27 portions, and the imaging station 16, are all provided in this example by only two servo drive motors, a first drive motor M1 and a second drive motor M2, respectively connected to the various document path sheet feeders as illustrated by the illustrated connecting dashed lines. Both of the drive motors M1 and M2 and a solenoid 28 (for selectively lifting the nudger roll of the input feeder), and the clutches, are controlled by a conventional programmable microprocessor controller 100. Servomotor M2 has a conventional integral or shaft connected encoder providing pulse signals in proportion to its rotation to a servo controller which may be part of the controller 100. Also connecting with the controller 100 in a conventional manner are sheet path sensors for detecting the lead and/or trail edge of document sheets being fed through the document paths 24, 27 such as the illustrated sensors 31, 32, 33, and 34. Thus, these sheet path sensors provide signals to the controller as to the present document position, when the respective sensor is activated. Because the document sheet or a portion thereof is thus known to be in a particular feeding nip moving it at a known speed, its position and movement distance can be predicted in advance in the controller 100 in a known manner, once the sheet is fully acquired in the non-slip document path.

An exemplary top sheet separator/feeder 30 here sequentially feeds the top sheet of the stack of documents loaded in the input tray 20 into the U shaped document path 24, and separates each fed sheet from the respective underlying sheets. The sheet separator/feeder 30 may be driven by the motor M1, as shown. A nudger roll 36 is lowered by solenoid 28 onto the top of the stack for feeding or advancing the top sheet or sheets 18 into a positive retard separating nip, comprising a driven first feed roll 37 and an undriven retard roll 38. The driven feed roll 37 rotates to feed the top-most sheet at that point in time downstream into the document path 24, while subsequent or underlying sheets are retarded by the frictional retard roll 38 forming a nip therewith. To prevent wear spots or the like on the retard roll 38, the roller 38 is allowed some limited rotational movement forward or downstream. However, this roller 38 downstream rotation is resisted by a connected return spring 39, which spring 39 is wound up by roller 38 downstream rotation due to the high friction between rollers 37 and 38 when they are directly engaged (with no sheets therebetween). Whenever two or more sheets are in the retard nip between the rolls 37 and 38, the wound-up return spring 39 force is strong enough to overcome the (lesser) friction between the plural sheets in the nip, to push back upstream the underlying sheets, providing improved separation as further explained in the above-cited references. Once the top sheet has been fully acquired and fed downstream past the adjacent feeder output sensor 31, the nudger 36 may be lifted to prevent inadvertent further feeding therewith of an underlying sheet, and prevent smearing of document images. The initial sheet input velocity is preferably substantially faster than the normal CVT velocity in the main portion of the document path. That higher initial velocity enables the lead edge of the (next) document being inputted to catch up with (close or minimize the interdocument pitch or gap with) the trail edge of the previous document in the document path, as will be further described later.

Once a top sheet has been separated and fed into the document path 24 as described above, it then enters the regular document path sheet drive system 40. This will be described here with reference to the driven rollers, although the mating and nip-defining idler rollers are also illustrated. As shown, these document path sheet drive rollers of this example comprise, in order: second or take-away rolls 42, registration rollers 44 substantially spaced downstream thereof, with an intermediate sheet deskew buckle chamber area therebetween, then first CVT rolls 46, then an imaging station 16 with a platen overlying sheet holddown CVT roller 47, then third CVT rolls 48, and then (after passing a pivotal gate 49) reversible exit nip rolls 50 at the entrance to the output tray 22.

Before the document is fed into the CVT transport path portion it may be lead-edge deskewed by slightly buckling the sheet with its lead edge against a squarely transverse or perpendicular surface. Here, merely by way of an example, against the illustrated gate (with movement arrows) upstream of the rollers 44 (or, alternatively, temporarily stopping that same nip). When the gate is released, the lead edge is captured in the nip 44 squared or deskewed. It is not necesary to open upstream feed nips for this.

The illustrated imaging station CVT roller 47 may be gravity or spring loaded against the platen, and may also provide, or be associated with, an imaging background surface for appropriate image background for the document being imaged at that point. It provides the control of the document being imaged to maintain all of document within the depth of field and focus of the imaging system as the document passes through the imaging station, i.e., to maintain a uniform restricted (very narrow height) maximum spacing gap above the imaging plane at the platen upper surface, of, e.g., less than 0.5 mm.

There is also shown here a platen gap 54 by a beveled platen edge 56 on the main or full size platen portion 12a end facing 12b, as shown. As described in more detail in said U.S. Pat. No. 5,339,139, this provides a space or groove extending below the upper surface of the platen portion 12b into which a small baffle lip or catch 52 may be desirably attached to edge 56. The baffle lip 52 extends above and below the upper surface of the platen portion 12b over which documents are being fed for imaging at the imaging station 16. Thus, the lead edge of documents fed through the imaging station 16 over the platen 12b upper surface are positively caught and deflected upwardly into the next feed nip.

Turning now to the exemplary output and duplex document handling system, a gate 49 is located at the downstream end of the U-shaped document path 24, just upstream of the reversible exit nip rolls 50 and at the entrance of the duplex document path 27. The gate 49 does not obstruct documents coming from the imaging station 16, irrespective of whether they are duplex or simplex documents. All documents here go directly past the imaging station 16 into the nip of the exit rolls 50. Simplex documents are desirably fed on by these rolls 50 without any reversal thereof out into the exit tray 22 for restacking there in proper collated page order. These documents stack face down in 1 to N order, if the documents were fed face up in 1 to N order from the input tray 20 and were inverted once in the U-shaped document path 24.

However, for duplex documents which have been imaged on their first side and are yet to be imaged on their second side, as soon as the trail edge of the duplex document passes the sensor 34, the controller 100 directs the reversal of the exit rolls 50. The duplex document sheet at that point is, as shown, extending substantially (for most of its length) out into the above-described inverter chute space between the trays 20 and 22. That duplex document sheet may now be rapidly reversed (feeding much faster than the CVT velocity) to be drawn back into the document handler toward the gate 49 by reversing rollers 50 at that point. The gate 49 is either solenoid or cam actuated or gravity loaded at this point into a position in which, as shown in phantom, the reversed duplex document is directed up into the duplex path 27. This duplex path 27 forms a return path of the duplex documents back into the entrance of the U-shaped path 24, as previously noted.

While the document sheet is being driven forward by the CVT drive system of M2 driving lower rolls 44, 46, 47 and 48 forward, the output roller 50 in that same path is desirably also driven forward by M2 at the same speed. However, when a duplex document is to be reversed, this may preferably be done by a clutch disconnecting the roller 50 shaft from M2, and then a simple reverse gear drive of the roller 50 shaft may be electrically clutched in at that point, as illustrated, to motor M1, while M1 continues to drive forward (downstream) the upper rollers 42 towards which the reversed document is fed by M1 reverse driven roller 50. To express it another way, for reversing, the clutch between roller 50 and M2 is disengaged and the clutch from M1 to the reverse gear drive for roller 50 is engaged. (Alternatively, a separate motor may be provided, if desired.) Note that for long duplex documents, this allows the trail end of the long duplex document to still be reverse fed out of roller 50 while the front end of that long document is already at the same time being fed forward through the CVT system for imaging by rollers 46, 47 and 48 driven forward by M2.

The combined duplex documents path 24, 27 provides a complete loop, as may be seen. This complete duplexing loop 24, 27 is quite small and compact. Desirably, it has dimensions only slightly larger than that of the longest document dimension to be fed therethrough. That is, this system is operative as long as the trail edge of the duplex document being inverted clears the sensor 34 before the lead edge of that same document sheet returns to the sensor 34 through the loop path 27, 24 after having its second side imaged at the imaging station 16.

This refeeding of duplex document sheets through the path 27 and 24 for second side imaging turns those document sheets over a second time. For proper collated output into the output tray 22, the duplex documents may be reinverted before restacking by being again fed back through the same path 27, 24 in the same manner, utilizing the same reversal of the exit rolls 50, but passing through without imaging, and then ejected (by not reversing the exit rolls 50). Thus, the duplex document is then ejected, properly oriented face down, into the output tray 22. Face down output for duplex documents is, of course, with the first or odd side page down, since this is a 1 to N system.

Referring to the duplex document scanning sequences available, the simplest sequencing algorithm is to process all documents in a simple 1 to N sequence, including "immediate duplex" sequencing of duplex originals. That is, side 2 of each duplex document may be scanned directly after side 1, followed by side 1 of the next fed document, etc. [Thus, one does not have to have 2 sheets in a document path at once.] The duplex document scanning sequence here may thus be side 1 of 1, skip, side 2 of 1, skip, side 1 of 2, skip, etc., relative to a normal inter-document gap for simplex documents feeding in this example of approximately 30 mm. Each "skip" is for inverting the document by reversal of the exit rolls 50 to feed that sheet back through the clockwise CVT path loop again; first for imaging its second side, and then for a non-imaging pass of the document sheet for re-inverting it again for proper output stacking. There is no need for deskew, constant velocity, or slowing down for CVT scan in this non-imaging pass. Thus, this third, non-imaging, document loop pass is desirably at a substantially higher (slew rate) velocity, to save time and increase overall duplex productivity. (However, the short path, simple drives and close document spacing may not allow that.) As noted, after the duplex sheet is fed through the document path for the third time, it returns back to the reversible exit rolls for the last time and is ejected to stack in collated order. However, it will be appreciated that there are other document sequencing alternatives.

A simple low cost undriven or passive device or element 11 may be provided at the sheet exit nip, as shown. The unit 11 here is a small three armed sheet separator in the sheet exit nip 51 area, which is driven only by the moving paper sheet itself, yet can correct the above-noted and other sheet handling problems. The integral, unitary or monolithic single piece device 11 illustrated here has three extending rigid arms or fingers, which three arms may be identical. It may be made as a small and relatively thin molded plastic part. One or more such separating devices 11 can be used, spaced transverse the paper path.

A unique mounting is provided for the sheet separating device 11. The triangular shape of its large mounting hub or aperture 13 automatically normally positions the three armed sheet separator 11 with one arm semi-vertically in the exit nip paper path. As a sheet is fed up to rollers 50 and then through the exit nip 51, that one arm is driven downstream by the moving sheet lead edge. This sheet induced motion causes rotation and then translation of the device 11 eccentrically on its triangular hub 13 about its mounting shaft 15. This movement of the device 11 causes an arm to guide in the incoming sheet above the prior sheets already stacked in the exit tray 22, and also to knock off any sheets hung up on the exit nip idler roll 53. This cycle repeats for the next entering sheet and so on. Each incoming sheet partially rotates the device 11.

The device 11 always initially rotatably re-positions itself by gravity in one of its three predetermined positions, due to its large triangular or trapezoidal center aperture 13. Thus, at least one of the fingers is always positioned to provide separation, and also to keep the prior sheet from being reacquired by the exit nip 51 when a sheet is reversed in that nip.

Referring now to FIG. 2, there is shown a timing chart with three lines of superimposed timing shown respectively for (1) the sheet separator/feeder 30 driven by servomotor M1, (2) the constant velocity transport (CVT) drive by servomotor M2, and (3) actuation times of paper path sensor 31. Sensor 31 is a sheet edge detector at the feeder output. Thus, the sensor 31 is located here at the exit of the feeder 30 takeaway rolls 42, just downstream thereof.

The vertical scale in lines 1 and 2 of this FIG. 2 represents the velocity at that particular point in time (along the horizontal scale) for the feeder takeaway rolls and for the CVT transport rolls, respectively. Also shown here, as will be discussed, A1 plus A2 plus A3 is a representation of the actual initial interdocument gap. The recovery distance is proportional to the difference between the measured gap and the desired (or nominal) gap, i.e., the desired minimized small spacing between documents, which is preferably a constant predetermined value.

As illustrated and described here, when the lead edge of the following document is sensed at sensor 31, the initial gap is calculated, the needed recovery distance is calculated in encoder pulse counts, and this information provided to the feed servo M1, so that the desired interdocument gap can be automatically achieved by recovery before imaging. The feed servomotor M1 is directed to run at its (preferably constant) high speed level for a longer (or shorter) distance (in pulse counts) for the time and feed distance necessary to recover to the desired interdocument gap distance, as measured in pulses from the encoder on servo motor M2. An accurate measurement is made of the document position between feeds of the documents with this system. This method is applicable to any document size, drive speeds, or reduction/enlargement ratio, although it is not limited thereto.

To describe the exemplary system and process example in further detail, the first document to be fed is handled as a special case, since there is not a preceding document and therefore no interdocument gap. The first document is thus fed by a defined (preset) distance by the feed motor M1 at its high speed level, and then ramped down to the CVT velocity for hand-off to the CVT transport at the same time in every case.

As a first step after the feeding of the first document, the trail edge of that (and every subsequent) document is detected by the paper path sensor 31. At that point, the feed clutch is not on. There is no subsequent sheet feed yet at this point (immediately after the trail edge detection of the prior sheet). Starting from the signal from the trail edge detection of the first document, a count is started in the servo controller 100 of the total servo motor M2 rotation encoder pulses. That is, a total of the encoder pulses from the constant speed (CVT) drive M2 is started to be counted after this first sensor 31 signals passage thereby of the first document's trail edge. Meanwhile, the feed servo M1 has been decelerated over a fixed distance after the trail edge of that first document had been detected at 31, as shown on the FIG. 2 timing chart. The interdocument gap with the preceding (first) document continues to grow, because the preceding document has been acquired by the CVT transport M2 which is driving it downstream at a constant velocity.

The next step is that the feed clutch for feeder 30, and solenoid 28, are activated by a feed signal from the controller 100 for the feeding of the next sheet. The timing for this next sheet feed signal is pre-set, preferably for a fixed time delay after the trail edge of the prior sheet clears sensor 31. This feed time delay is preferably sufficient to induce an initial interdocument gap not less than the desired minimum gap, even if the next sheet feeds out almost immediately (without delays).

At a varying time after this next sheet feed signal, as explained above, the lead edge of the next document will emerge from the feeder 30 and be detected at sensor 31. The distance the CVT servo M2 has fed the prior document since the trail edge detection at 31 of that prior sheet is now known from the step encoder count from M2. It is the total pulse count between these two sequential signals from sensor 31. I.e., the total M2 encoder count in the time period between the trail edge of the prior document clearing sensor 31, and the next document lead edge occluding sensor 31. Since M2 is operating at a constant speed, and the leading portion of the document is in the M2 feed path and controlled thereby when its trail edge clears sensor 31, this provides an accurate measurement of the initial interdocument gap A1 +A2 +A3 at this point in time. This is the uncorrected gap. Describing this example further with reference to FIG. 2, the following steps, in order, and exemplary formulas, may be applied:

1. Trail edge of document n is detected by the paper path sensor 31.
2. The CVT servo position then is latched in memory.
3. The DH feeder (DHF) servomechanism decelerates a fixed distance after this sensor 31 signal.
4. The DH feeder servo cycle is complete.
5. After a predetermined delay, the n+1 document feed cycle begins.
6. The lead edge of document n+1 is detected. The distance the sheet n trail edge has traveled is the servo position minus the position latched in step 2. Hence the MEASURED GAP is known, i.e., A1+A2+A3 in CVT pulses.

The required RECOVERY DISTANCE, A4+A5+A6+A7 (measured in feed pulses), is the distance beyond the lead edge of sheet n+1 at the sensor 31 position that the feed servo needs to drive (including the ramp-down to CVT speed), to reach the catch-up point where the desired (DG) interdocument gap (IDG) is obtained.

The desired IDG in pulses=DG=0.150×$V_s$×$k_f$ pulses/mm where $k_f$=the conversion factor from millimeters of document feed to feed motor encoder pulses. The 0.150 number is for a 150 ms interdocument gap, and will vary depending on the desired gap. (The constants depend on the particular drive system.)

$MG - A4 - A7 = DG$ (where $MG$ = MEASURED GAP converted to feed servo encoder pulses from $CVT$ pulses)

$A4 + A7 = MG - DG = k_f(V_f - V_s) \times (t_1 + (t_2/2))$;
therefore $t_1 = ((MG - DG)/k_f(V_f - V_s)) - t_2/2$;
$A4 = t_1 k_f(V_f - V_s)$; $A5 = t_1 k_f(V_s)$; $A7 = k_f(t_2/2)(V_f - V_s)$;
and $A6 = t_2 k_f(V_s)$ RECOVERY DISTANCE = $A4 + A5 + A6 + A7$ =
$(A4 + A7) + (A5 + A6)$
 = $(MG - DG) + k_f V_s(t_1 + t_2)$
 = $MG - DG + k_f V_s t_2 + k_f V_s(1(MG - DG)/k_f(V_f - V_s)] - t_2/2)$
 = $MG - DG + k_f V_s t_2/2 + [k_f V_s(MG - DG)/k_f(V_f - V_s)]$
 = $(MG - DG)(1 + [V_s/(V_f - V_s)]) + k_f V_s t_2/2$;
where $DG$, and $k_f V_s t_2/2$, are displacements in feeder encoder pulses and $MG$ is the measured gap converted from $CVT$ servo encoder pulses to feeder servo encoder pulses.

If preferred, RECOVERY DISTANCE can be expressed as the distance to the start of ramp-down by subtracting the constants A6 and A7 from the constant portion of this equation.

It will be appreciated that the servo M1 must be running sufficiently faster than servo M2 and/or the path distance between the sensor 31 and the first CVT M2 driven nip must be sufficiently long, so that the gap recovery may be made up in the initial in-feeding path before the sheet must be decelerated to the M2 velocity to enter the second or CVT path portion of the document path.

Note that here, unconventionally, timing signals from sensor 31 in the first path portion, driven by motor M1, are being used in combination with pulse counts from another drive, M2, in another, second, document path portion. I.e., M2, not M1, drive signals are being counted here, even though sensor 31 is in the M1 drive area of the document path.

Note that this exemplary system makes use of the difference in the known, preset, higher constant velocity of the feed and takeaway rollers driven by motor M1 (the first path portion) as compared to the slower CVT motor M2 driving of everything else downstream thereof. That is, the substantially higher feeding velocity of the feeder by M1 (shown in FIG. 2 in the first lines' vertical scale), enables the faster moving upstream document to "catch up" with the downstream document to close the interdocument gap. That is possible even though this gap was increased by temporarily stopping the upstream document lead edge for registration or deskewing while the downstream document was proceeding at the CVT velocity. This system automatically compensates for wide variations which can occur in the time of arrival of the lead edge of the next document at sensor 31, i.e., wide variations in the feeding time of the next document, as noted above.

Alternatively, controller 100 clock pulses would be counted between sensor 31 actuations rather than motor M2 encoder pulses. However, not only is this above embodiment more accurate, and directly related to sheet movement, it also avoids having to convert back and forth between clock pulse counts and servo encoder and driver pulse counts.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a document handling system for sequentially feeding document sheets with an interdocument gap therebetween to be imaged at an imaging station, including a sheet separator-feeder feeding the document sheets from a stack of document sheets in an input tray through a document feeding path to said imaging station, and including a constant velocity document sheet transport for feeding the document sheets through said imaging station at a constant velocity; wherein said sheet separator-feeder sequentially feeds document sheets from said stack of document sheets in said input tray with initial interdocument gap variations, the improvement comprising:

- a system for automatically controlling the interdocument gap between said sequential document sheets in said document feeding path;
- said document feeding path having an upstream first document feeding path portion;
- a first servo drive system for feeding the document sheets in said first document feeding path portion;
- a second document feeding path portion downstream of said first document feeding portion for receiving the document sheets fed from said first document feeding path portion;
- a second servo drive system for feeding the document sheets in said second document feeding path portion;
- said second servo drive system providing said constant velocity document sheet transport through said imaging station;
- a sheet edge sensor system in said first document feeding path portion adjacent to and downstream of said sheet separator-feeder for providing an electrical signal upon the passage therepast of the lead or trail edge of document sheets in said first document feeding path portion;
- and a servo controller connecting with said sheet edge sensor system and said first servo drive system to automatically measure said initial interdocument gap variations and change the feeding of document sheets in said first document feeding path portion relative to said second document feeding path portion to automatically change said interdocument gap to a preset desired minimum interdocument gap in said second document feeding path portion.

2. The document handling system of claim 1, wherein said second servo drive system has an encoder generating encoder signals proportional to said constant velocity sheet transport and said servo controller counts said encoder signals between the passage of the trail edge of a document sheet past said sheet edge sensor system and the passage of the lead edge of the next sequential document sheet past said sheet edge sensor system, and compares that encoder signals count to a preset stored count to calculate control signals for said first servo drive system to automatically change said initial interdocument gap toward said desired minimum interdocument gap.

3. The document handling system of claim 1 wherein said sheet edge sensor system comprises a sheet edge sensor closely adjacent the sheet exit of said separator-feeder.

4. The document handling system of claim 1 wherein said first servo drive system changes said initial interdocument gap by changing the time period in which said first servo drive system is driven at a substantially higher speed than said second servo drive system.

5. The document handling system of claim 2 wherein said sheet edge sensor system comprises a sheet edge sensor closely adjacent the sheet exit of said separator-feeder.

6. The document handling system of claim 5 wherein said first servo drive system changes said initial interdocument gap by changing the time period in which said first servo drive system is driven at a substantially higher speed than said second servo drive system.

* * * * *